Figure 1A:
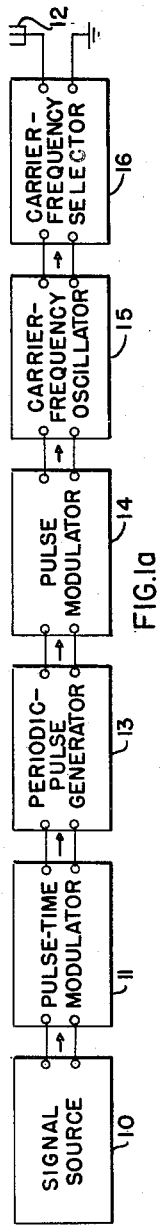

Sept. 2, 1952

H. A. WHEELER 2,609,496

SIGNAL TRANSLATING ARRANGEMENT

Filed March 18, 1947

3 Sheets—Sheet 1

*INVENTOR.*
HAROLD A. WHEELER

BY *John Q. Harvey*

ATTORNEY

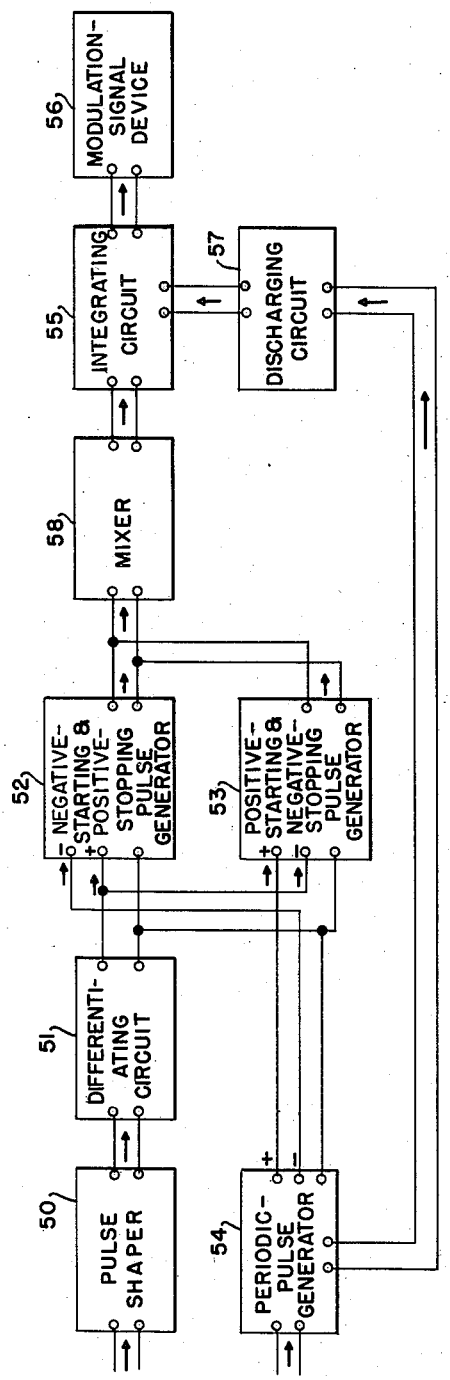

Patented Sept. 2, 1952

2,609,496

UNITED STATES PATENT OFFICE 2,609,496

SIGNAL TRANSLATING ARRANGEMENT

Harold A. Wheeler, Great Neck, N. Y., assignor to Hazeltine Research, Inc., Chicago, Ill., a corporation of Illinois Application March 18, 1947, Serial No. 735,286

5 Claims. (Cl. 250—20)

1

This invention is directed to signal translating arrangements for time-modulated signal pulses and, particularly, to signal translating arangements which derive modulation signals from time-modulated signal pulses but are less responsive to a kind of noise modulation which displaces the edges of the aforesaid pulses in a certain manner.

Pulse-time-modulation systems have been employed to transmit and receive intelligence, in which repeating carrier-frequency wave-signal pulses of short duration are transmitted in a conventional manner and are modulated in time relative to a prescribed periodicity of recurrence. The time shift of these carrier-frequency pulses is modulated in proportion to the instantaneous value of a modulation signal which contains the information. The time-modulated pulses which are translated by the receiver in such a system are subject to distortion by certain low-frequency components of noise which undesirably shift the amplitude of these pulses. This is effective to displace the leading and the trailing edges of each pulse in opposite directions, thereby increasing or decreasing the width of the received pulse while leaving its center unchanged in time.

Heretofore the receivers for time-modulated wave-signal pulses have been responsive to either the leading or the trailing edges of received pulses. While such receivers have translated time-modulated pulses which were subject to noise of the type under consideration, they have not afforded the greatest advantage over noise. These receivers have retained some noise caused by detecting the shift of the leading or the trailing edges of the received pulses, even when the centers of the pulses may have been shifted much less by certain noise components.

It is an object of the invention, therefore, to provide a new and improved signal translating arrangement for time-modulated signal pulses which avoids the above-mentioned disadvantages of prior such arrangements.

It is another object of the invention to provide a new and improved wave-signal receiver for time-modulated wave-signal pulses which is adapted to reduce noise response relative to the desired modulation.

It is an additional object of the invention to provide a signal translating arrangement which is responsive to the time modulation of the signal pulses but which is less responsive to the modulation of the edges of the aforesaid pulses by certain components of noise.

It is a still further object of the invention to provide a signal translating arrangement which is effectively responsive to the centers of time-modulated signal pulses and is substantially unresponsive to such noise modulation as causes opposite displacements of the leading and the trailing edges of the pulses.

In accordance with the invention, a wave-signal translating arrangement for signal pulses having leading and trailing edges, at least one type of edges thereof time-modulated in accordance with a modulation signal, comprises means effectively responsive to the pulses for deriving from each thereof a pair of pulses, each pulse of the pair having a pulse characteristic which varies with the time of occurrence of an individual type of the edges of each applied pulse. The arrangement also includes means responsive to each of the pairs of derived pulses for developing therefrom at least one pulse having a characteristic which varies with the average time of occurrence of the edges of each applied pulse. The arrangement further includes means responsive to the characteristic of the developed pulses for deriving a resultant modulation signal which is dependent on the time modulation of the pulses, whereby the arrangement is made substantially less responsive to noise modulation which tends to displace the aforesaid one type of edges and the other type of edges of the pulses in opposite directions.

For a better understanding of the present invention, together with other and further objects thereof, reference is had to the following description taken in connection with the accompanying drawings, and its scope will be pointed out in the appended claims.

Figure 1B:
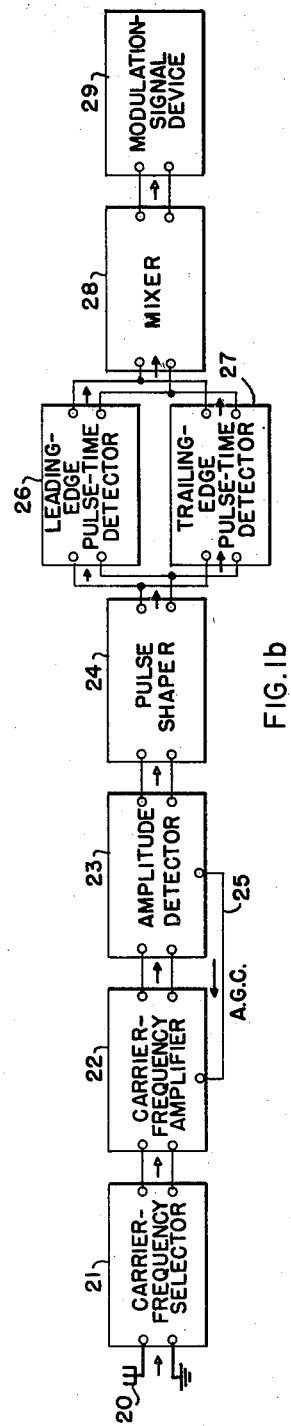
Figure 3:
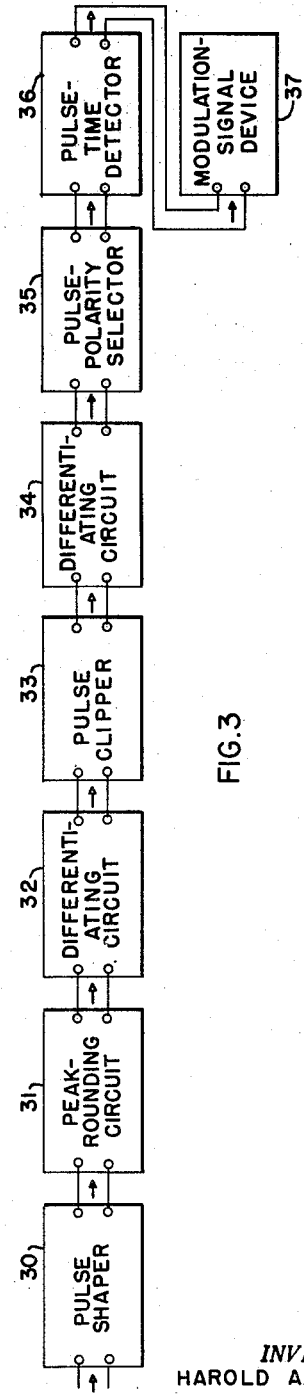
Figure 4:
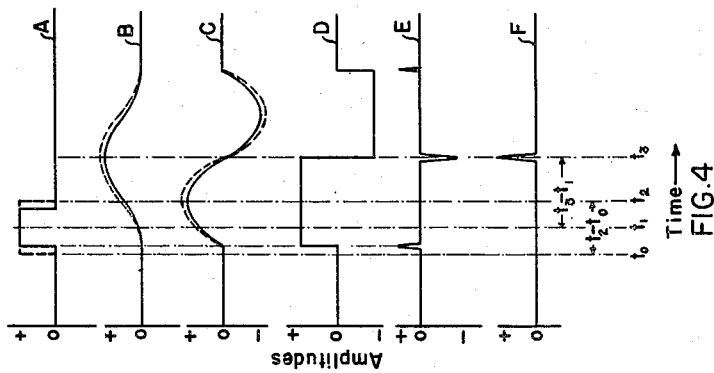
Figure 2A:
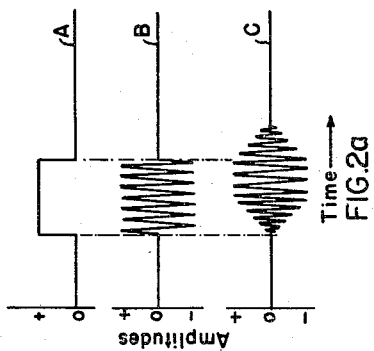
Figure 2B:
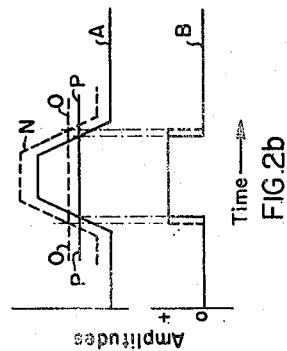

Referring now to the drawings, Fig. 1a represents a transmitter for time-modulating wave-signal pulses; Fig. 1b is a representation of a receiver arrangement in accordance with the present invention for translating time-modulated wave-signal pulses; Figs. 2a and 2b comprise wave forms which are used in explaining the operation of the transmitter and receiver arrangements, respectively, of Figs. 1a and 1b; Fig. 3 is a representation of a modified form of the wave-signal translating arrangement in accordance with the invention; Fig. 4 comprises graphs which are utilized in explaining the operation of the arrangement of Fig. 3; Fig. 5 is a representation of an additional modification of the invention; and Fig. 6 comprises graphs which are useful in explaining the operation of the Fig. 5 arrangement.

Referring now to Fig. 1a of the drawings, there is represented schematically a preferred form of a wave-signal transmitter arrangement for transmitting time-modulated wave-signal pulses for reception and use by a wave-signal receiver in accordance with the present invention, which receiver will be described in detail subsequently. The transmitter comprises a signal source 10 which supplies modulating signals such as music or speech. The output circuit of the source 10 is connected to the input circuit of a pulse-time modulator 11 which is, in turn, connected in cascade to an antenna system 12 through a periodic-pulse generator 13, a pulse modulator 14, a carrier-frequency oscillator 15, and a carrier-frequency selector 16. Details of these units including the pulse generator 13 are well known in the art so that a description thereof is deemed unnecessary. The periodic-pulse generator 13 may comprise any one of several conventional kinds of generators for developing wave-signal pulses having at least one type of edges thereof, for example the leading or the trailing edges or both, time-modulated in accordance with an instantaneous value of the modulation signal. Transmitters of the general type as well as pulse-time-modulation systems are described in the literature. Reference is made to the article entitled "Pulse-Time-Modulated Multiplex Radio Relay Systems—Terminal Equipment," by B. D. Grieg and A. M. Levine in Electrical Communication, volume 23, No. 2, June 1946.

Considering briefly the operation of the wave-signal transmitter, a modulation signal is supplied by the source 10 to the pulse-time modulator 11 where it is amplified and applied to the input circuit of the periodic-pulse generator 13. The output signal of the modulator 11 is effective to alter a factor effecting the operation of the pulse generator 13, such as the bias thereof, thereby developing a series of pulses which are time-modulated in accordance with an instantaneous value of the modulation signal from the source 10, for example the amplitude thereof. The time-modulated pulses, one of which is illustrated in curve A of Fig. 2a, are amplified in unit 14 and are then utilized thereby to pulse-modulate the carrier-frequency oscillator 15. This oscillator is preferably one in which oscillations build up quickly in response to an applied modulation pulse in order to minimize "jitter" or undesired noise modulation of the leading edge of the carrier-frequency pulse. The oscillator preferably delivers an output pulse having an envelope which is substantially rectangular as represented in curve B of Fig. 2a. Since it is preferable to transmit time-modulated carrier-frequency pulses having sloping edge portions, to reduce sideband interference, the carrier-frequency selector 16 is designed to shape each pulse to a trapezoidal shape as illustrated in curve C of Fig. 2a. The slope interval of the carrier-frequency pulse is preferably a substantial fraction, for example, approximately one-third of the over-all pulse width, thus holding the band-width requirements near the minimum. The time-modulated series of trapezoidal output pulses which are applied by the selector 16 to the antenna system 12 are radiated thereby in the usual manner. These pulses are adapted for use by a wave-signal receiver, in accordance with the present invention, which is presently to be described.

Referring now to Fig. 1b of the drawings, the wave-signal receiver in accordance with the invention which is there illustrated comprises an antenna system 20 which is connected to the input circuit of a conventional carrier-frequency selector 21. The carrier-frequency selector 21 is connected in cascade with a conventional amplifier 22 and an amplitude detector 23 of well-known construction for deriving rectified pulses from the applied carrier-frequency pulses. An automatic-gain-control or A. G. C. connection 25 is preferably provided from the amplitude detector 23 back to the carrier-frequency amplifier 22. The output circuit of the detector 23 is connected to the input circuit of a pulse shaper 24. The pulse shaper 24 comprises an amplifier arrangement of any desired number of stages, at least one of which is adapted to shape the applied unidirectional pulses by clipping and amplitude-limiting actions. This may be accomplished by a stage in which the operation potentials are so adjusted that it will translate only an intermediate amplitude range of an applied pulse, eliminating the higher and lower levels thereof by anode-current limiting and anode-current cutoff phenomena, respectively.

The receiver also includes means effectively responsive to the aforesaid one type of edges of the time-modulated wave-signal pulses, for example the leading edges thereof, for deriving a first electrical effect varying with the timing of those edges. This means comprises a leading-edge pulse-time detector 26 which may include a differentiating circuit in combination with a pulse-time detector of conventional construction, the details of which are well known in the art so that a detailed description thereof is unnecessary. The input circuit of the leading-edge pulse-time detector is connected to the output circuit of the pulse shaper 24. The wave-signal translating arrangement also includes means effectively responsive to the other type of edges, namely the trailing edges, of the time-modulated pulses for deriving a second effect varying with the timing thereof in the same sense as the first effect varies with the timing of the aforesaid leading edges. This means comprises a trailing-edge pulse-time detector 27 which is connected to the output circuit of the pulse shaper 24 and may be similar to the leading-edge pulse-time detector 26 except for the differences which cause it to respond to the trailing edges. Each detector 26 or 27 may include a differentiating means which is effective to derive pulses of short duration in response to the leading or the trailing edges of the output pulses from unit 24. If desired, a differentiating circuit may be employed as part of unit 24 to serve both of the pulse-time detector units 26 and 27.

The wave-signal translating means in accordance with the present invention also includes means responsive in the same sense to the aforementioned first and second effects for developing a resultant modulation signal which is dependent on the time modulation of the pulses, specifically the leading edges thereof as mentioned above. This means comprises a mixer 28, the input circuit of which is connected to each of the output circuits of units 26 and 27. The output circuit of the mixer 28 is connected to a conventional modulation-signal device 29 which may be, for example, a loudspeaker for utilizing the resultant modulation signal developed in the mixer 28.

Considering now the operation of the described wave-signal receiver, time-modulated wave-signal pulses of the type illustrated in curve C of Fig. 2a are intercepted by the antenna system 20 and are selected and amplified in carrier-frequency selector 21 and carrier-frequency amplifier 22. The output signals of the latter are applied to the amplitude detector 23 which derives unidirectional rectified pulses of the type represented in the full-line and the broken-line construction in curve A of Fig. 2b, for application to the input terminals of the pulse shaper 24. Detector 23 also develops automatic-gain-control biasing potentials which are applied to one or more tubes of the amplifier 22 by way of connection 25 to maintain the amplitude of the signal input to the detector within a relatively narrow range for a wide range of received signal intensities.

The unidirectional output pulses derived by detector 23 are subject to disturbances, for example, thermal-agitation noise, power-supply hum and the like, hereinafter referred to as noise, which originates in preceding stages of the receiver or elsewhere. One type of such noise, exemplified by a low-frequency sideband component of random noise, while being translated through the carrier-frequency and detector portions of the receiver, is detected as superimposed on the desired pulses and thereby undesirably alters the height and the effective width of the detected pulses. From the typical pulse N, illustrated in broken lines in curve A of Fig. 2b and representing a detected pulse with superimposed noise, it will be seen that the noise is effective to displace the leading and the trailing edges of each pulse in opposite directions by approximately the same amount. For example, the leading edge is shown advanced in time and the trailing edge retarded by an increase of amplitude of the detected pulse, so that any time-responsive effects derived solely from either one of the types of edges is subject to interference from the noise.

Pulse shaper 24, by amplification combined with amplitude-limiting and clipping action at the levels O—O and P—P near the one-half amplitude level of an applied pulse, as indicated in curve A of Fig. 2b, provides a substantially rectangular signal as illustrated in curve B of the same figure. The full-line construction represents an output pulse unaffected by noise while the broken-line portions represent the edges of a pulse which is disturbed by noise of the type under consideration. By differentiation of these applied rectangular pulses from the pulse shaper 24, unit 26 derives short-duration pulses effectively corresponding to the leading edges of the output pulses of amplitude detector 23 and, in a manner well understood in the art, also derives a first effect which varies with the timing of the time-modulated edges of the last-mentioned output pulses and is also proportional to the time displacement of the time-modulated edges thereof. This effect comprises an output signal, generally similar to that of the modulation signal developed by the signal source 10 of Fig. 1, which is applied to the mixer 28.

Unit 27, operating in a manner similar to that of unit 26, develops short-duration pulses from the trailing edges of the substantially rectangular pulses applied to its input circuit and converts the short-duration pulses to an effect which varies with the timing and the time displacements of the trailing edges of the output pulses of detector 23. This effect varies in the same sense as the first-mentioned effect of unit 26 varies with the timing of the leading edges of time-modulated pulse output of the detector 23. The effect derived by unit 27, which is also applied to the input circuit of the mixer 28, resembles the modulation signal provided by the signal source 10.

Mixer 28, which is responsive in the same sense to the previously mentioned first and second effects derived by units 26 and 27, combines these effects or signals and develops a resultant modulation signal corresponding to the output signal of source 10. The combining action effected on the output signals from detectors 26 and 27 is in the same polarity so that the effects of variations in the pulse width of the output pulses from the detector 23 caused by noise of the type under consideration are cancelled out. Consequently it may be said that the mixer 28 develops a resultant modulation signal which is substantially proportional to the time displacement of the centers of the time-modulated pulses from the amplitude detector 23, the positions of these centers being substantially unaffected by the low-frequency components of noise. Thus the arrangement is less responsive to noise modulation which tends to displace the leading edge of each time-modulated pulse in one direction and the trailing edge thereof in the other direction. Hence, the output signal from the mixer 28, which is applied to the modulation-signal device or loudspeaker device 29 for reproduction, more faithfully corresponds to the signal developed by the source 10 than if either of the pulse-time detectors 26 and 27 were omitted.

Referring now to Fig. 3 of the drawings, there is illustrated a modified wave-signal translating arrangement in accordance with the present invention. This embodiment comprises a pulse shaper 30, which is similar in construction and operation to the pulse shaper 24 of the Fig. 2 arrangement, for deriving from a preceding unit rectangular pulses having substantially constant amplitudes. Accordingly, the input terminals of pulse shaper 30 are adapted to be connected to the carrier-frequency and amplitude-detector portions of a receiver as illustrated in Fig. 1b of the drawings. The wave-signal translating arrangement also includes means for deriving from the aforesaid rectangular pulses symmetrical peaked pulses, of which the centers are delayed with respect to the centers of the corresponding rectangular pulses by a constant time interval which in practice is preferably greater than the duration of the rectangular pulses. This means comprises a peak-rounding circuit 31. The latter may be a low-pass gradual cut-off filter having a linear phase characteristic of uniform phase slope. Peak-rounding circuit 31 is connected to a pulse clipper 33 through a conventional differentiating circuit 32 which derives a pair of pulses of opposite polarity from the leading and the trailing edges of each of the above-mentioned peaked pulses. Pulse clipper 33 is an amplifier and clipping unit of conventional construction which is adapted to remove the positive and negative portions of an applied signal which exceeds predetermined amplitude levels in a manner to develop pairs of pulses having a steep transition between each pair. The wave-signal translating arrangement also includes means for differentiating each of the clipped pairs of pulses to derive three shorter pulses. This means comprises a conventional differentiating circuit 34 which is connected to the output circuit of the pulse clipper 33.

The wave-signal translating arrangement further includes means responsive to only the middle one of the three pulses for deriving an output pulse. This means comprises a well-known pulse-polarity selector 35 which is adapted to translate pulses of but one polarity, namely, the polarity of the middle pulse. Pulse-polarity selector 35 is connected to a conventional modulation-signal device 37 through a conventional pulse-time detector 36.

Considering now the operation of the arrangement of Fig. 3, a series of time-modulated wave-signal pulses, each of which may resemble the pulse illustrated in curve A of Fig. 2b, are applied to the input terminals of pulse shaper 30. As explained in connection with the Fig. 1 embodiment, each applied pulse may be subject to undesired noise modulation which tends to shift the edges in opposite directions. Pulse shaper 30 derives a substantially rectangular pulse of the type illustrated in curve A of Fig. 4 for application to the peak-rounding circuit 31. Pulse-width variations due to noise of the type under consideration are again indicated in broken-line construction in Fig. 4. Peak-rounding circuit 31 converts the applied rectangular pulses to symmetrical peaked pulses of the type illustrated in curve B of Fig. 4, in which the centers are delayed with respect to the centers of the corresponding rectangular pulses by a constant time interval which is shown greater than the duration of each rectangular pulse. Accordingly, the time interval $t_3-t_1$ is shown greater than the time interval $t_2-t_0$. It will be seen from curve B of Fig. 4 that the noise influences the amplitude of the peaked pulses but not the timing of the peaks. The differentiating circuit 32 derives from each of the last-mentioned pulses a pair of pulses of opposite polarity similar to those illustrated in curve C of Fig. 4, the amplitude and the width of each being subject to variations by undesired noise, but not the timing of the intercept. These paired pulses of opposite polarity are amplified and clipped by pulse clipper 33 to derive pairs of pulses as illustrated in curve D, each pair having a steep transition therebetween. It will be seen that these pulses are substantially free from noise interference. Differentiating circuit 34 derives from these pairs of rectangular pulses three consecutive pulses of shorter duration as illustrated in curve E. The intermediate one of these pulses has the greatest amplitude and a polarity which is opposite to that of the other two short-duration pulses. Pulse-polarity selector 35, which is responsive only to the polarity of the middle one of the three pulses applied to the input circuit thereof, therefore produces an output pulse which is coincident with the center of each of the above-mentioned peaked pulses developed by unit 31. Pulse-time detector 36 utilizes the output pulses of selector 35 in the conventional manner for developing a modulation signal which is dependent upon the time modulation of the wave-signal pulses but which is relatively free of the undesired noise modulation of the type under consideration. The modulation-signal device 37 converts the signal output of detector 36 to sound or some other useful form.

Referring now to Fig. 5 of the drawings, the modification there represented comprises a pulse shaper 50 for developing rectangular pulses and having an input circuit which is adapted to be connected to the output circuit of the amplitude detector unit 23 of the receiver as illustrated in Fig. 1b. Pulse shaper 50, which is similar to units of the same characteristic previously described, is connected to a conventional differentiating circuit 51 for deriving from the pulses applied thereto shorter pulses coincident respectively with the leading and the trailing edges of the pulses from the pulse shaper 50. The wave-signal translating arrangement also includes a periodic-pulse generator 54 for generating relatively long pulses synchronized by well-known means (not shown) at a periodicity prescribed for the transmission, which corresponds to the mean frequency of the pulses generated by the pulse generator 13 of the transmitter represented in Fig. 1a of the drawings. Each of these long pulses has a duration somewhat greater than the range of time modulation of the transmitted pulses. The wave-signal translating arrangement also includes means responsive to each of these long periodic pulses and the concurrent signal pulse for generating a pair of pulses having leading edges which are substantially coincident with the leading edge of the long pulse and trailing edges coincident respectively with the leading and trailing edges of the signal pulse. This means comprises a negative-starting and positive-stopping pulse generator 52 and a positive-starting and negative-stopping pulse generator 53 of conventional construction. Generator 52 is adapted to develop pulses having the same amplitudes as those generated by generator 53. The pulse generator 54, which generates simultaneous output pulses of opposite polarities, has its output circuit for positive pulses connected to the input circuit of the positive-starting pulse generator 53 and its output circuit for negative pulses connected to the negative-starting pulse generator 52. The positive-stopping input circuit of pulse generator 52 is connected to the output circuit of the differentiating circuit 51 and the negative-stopping input circuit of pulse generator 53 is likewise connected to the differentiating circuit 51. The output circuits of the pulse generators 52 and 53 are connected to a mixer 58 which is arranged to combine the two pulses of each pair of output pulses of units 52 and 53 in the same sense to obtain a composite pulse, as will be explained subsequently.

The mixer 58 is connected to a conventional modulation-signal device 56 through an integrating circuit 55. A discharging circuit 57, which is responsive to the trailing edge of each long pulse generated by the pulse generator 54, is connected between an output circuit thereof and the discharging circuit of the integrating circuit 55.

Figure 6:
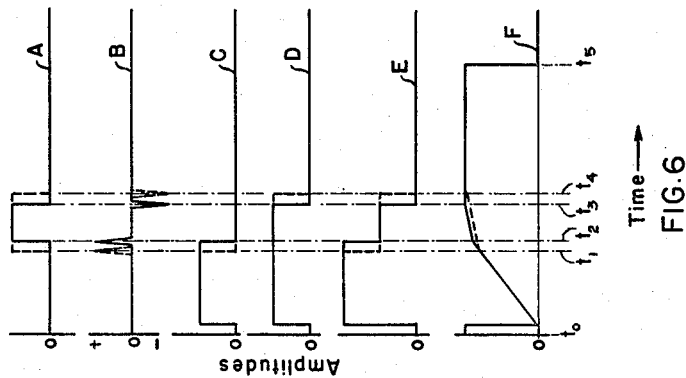

In considering the operation of the arrangement of Fig. 5, reference is made to the graphs of Fig. 6. As in the previous embodiments, a series of pulses of the type represented by the single, substantially rectangular, full-line pulse appearing at the interval $t_3-t_2$ in curve A of Fig. 6 are derived by the pulse shaper 50 and are supplied to the differentiating circuit 51. Undesirable noise modulation which advances the leading edges and retards the trailing edges may change the pulse interval to $t_4-t_1$. The short output pulses of the differentiating circuit 51, as represented by the pair in curve B of positive and negative polarities, which are coincident respectively with the leading and the trailing edges of the signal pulse, are applied to the stopping input circuits of the pulse generators 52 and 53. Shortly before the occurrence of an output pulse from the pulse shaper 50, the pulse generator 54 generates a synchronized long pulse at time $t_0$ having a duration $t_5-t_0$. This long pulse is applied positively to the positive-starting pulse generator 53 and negatively to the negative-starting pulse generator 52 in such a manner that both of the generators 52 and 53 are triggered into operation at time $t_0$. At time $t_1$ or $t_2$, depending on the presence of noise modulation in the output pulse of pulse shaper 50, the pulse generator 52 is stopped by the positive short pulse from the differentiating circuit 51, so that the output pulse of generator 52 has the wave form illustrated in curve C with a duration $t_1—t_0$ or $t_2—t_0$. Similarly, since the negative short pulse from the differentiating circuit 51 is applied to the stopping input circuit of the pulse generator 53, the output pulse of the latter, which is illustrated in curve D of Fig. 6, is terminated at time $t_3$ or $t_4$, depending on the presence or the absence of noise. Thus, the duration of the output pulse of the pulse generator 53 is either the interval $t_3—t_0$ or $t_4—t_0$.

The output pulses of generators 52 and 53 are applied to the mixer 58 which combines them in the same sense to develop the composite pulse shown in curve E of Fig. 6. Integrating circuit 55 integrates the composite pulse from the mixer 58 and develops a resultant pulse as illustrated in curve F. At time $t_5$ the trailing edge of a long pulse from pulse generator 54 actuates the discharging circuit 57, thereby discharging the integrating circuit so that the resultant pulse from the integrating circuit is terminated.

Referring now to curve E of Fig. 6, it will be seen from the geometry of the noise-free pulse and that of the noise-modulated pulse that the effect of noise, as represented by the broken line, on the first trailing-edge portion of the composite pulse decreases the area of the pulse by a given amount while the effect of the noise on the second trailing-edge portion increases the pulse area by a corresponding amount. Consequently noise modulation of the signal input to the wave-signal translating arrangements does not alter the over-all area of the composite pulses which are applied to the integrating circuit.

While undesired noise alters one of the slopes of each long pulse from the integrating unit 55, as represented by the broken line of curve F between the interval $t_4—t_1$, the integrated amplitude of curve F is not affected by the noise. However, the amplitude of curve F is directly proportional to the mean of the durations of the pair of pulses shown in curves C and D of Fig. 6, which are applied to the mixer 58 by the pulse generators 52 and 53. These durations are determined by the timing of the leading-edge and trailing-edge short pulses which are derived from the differentiating circuit 51, which timing corresponds to the time modulation of the pulses applied to the pulse shaper 50. Consequently, a time modulation by an advance or a retardation of the pulse illustrated in curve A of Fig. 6 will respectively decrease or increase the amplitude of the resultant pulse of curve F.

The integrated pulses of varying amplitude, represented by the single pulse of curve F of Fig. 6, are smoothed out in unit 55 by means primarily responsive to the maximum amplitudes of the pulses and the resultant modulation signal is then impressed on the modulation-signal device 56 for conversion to sound or other suitable indication. Accordingly, the described wave-signal translating arrangement develops a resultant modulation signal which is responsive to the time modulation of the edges of the applied input pulses but substantially less responsive to any noise modulation which tends to displace the leading and trailing edges of the pulses in opposite directions.

It will be clear from the foregoing description that the differentiating circuit 51 in conjunction with the periodic-pulse generator 54 and the pulse generator 52 comprises means responsive to the leading edges of the pulses applied to the input circuit of the wave-signal translating arrangement for deriving a first effect which varies with the timing of the time-modulated edges. It will also be apparent that the differentiating circuit 51 coacting with the periodic-pulse generator 54 and the pulse generator 53 comprise means effectively responsive to the trailing edges of the pulses for deriving a second effect varying with the timing thereof in the same sense as the first effect varies with the timing of the leading edges of the pulses. It will also be seen that the mixer 58 and the integrating circuit 55 comprise means responsive in the same sense to the aforesaid first and second effects for developing a resultant modulation signal which is dependent on the time modulation of the pulses which are applied to the input circuit of the arrangement.

It will be apparent that the invention is applicable to time modulation of the edges of the pulses, which modulation is effective to shift the positions of successive pulses in accordance with the instantaneous value of the modulating signal, and is also applicable to the pulse-width type of pulse-time modulation if the duration of each pulse is varied by time-modulating either edge but not both edges in accordance with an instantaneous value of the modulating signal.

While the invention has been described in connection with a single-channel arrangement for translating time-modulated pulses representative of one message or modulating signal, it is equally applicable to time-division multiplexing wherein conventional time-sharing units are associated with any of the described arrangements in order that a plurality of messages may be translated.

It will be apparent from the above descriptions that a wave-signal translating arrangement in accordance with the present invention which is responsive to time-modulated pulses is substantially less responsive to any noise modulation which tends to displace the leading and trailing edges of the pulses in opposite directions.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave-signal translating arrangement for wave-signal pulses having leading and trailing edges, at least one type of said edges being time-modulated in accordance with a modulation signal, comprsing: amplifying and clipping means for deriving substantially rectangular pulses from said first-mentioned pulses; means for differentiating said rectangular pulses to derive much shorter duration pulses in time coincidence with said leading and said trailing edges; a pulse-time detector responsive to said leading-edge shorter duration pulses for deriving a first effect varying with the timing of said leading edges; a pulse-time detector responsive to said trailing-edge shorter duration pulses for deriving a second effect varying in the same sense with the timing of said trailing edges; and means responsive to said first and second effects for combining in the same sense said effects to develop a resultant modulation signal which is dependent on said time modulation of said wave-signal pulses, whereby said arrangement is made substantially less responsive to noise modulation which tends to displace said leading and said trailing edges in opposite directions.

2. A wave-signal translating arrangement for wave-signal pulses having leading and trailing edges, at least one type of said edges being time-modulated in accordance with a modulation signal, comprising: means for generating periodic pulses of the same average period as said wave-signal pulses but of duration longer than the range of time modulation; means responsive to each of said periodic pulses for generating a pair of pulses having leading edges which are substantially coincident with the leading edges of said periodic pulses, and responsive to said wave-signal pulses for ending one pulse of said pair thereof in coincidence with the leading edge of the concurrent wave-signal pulse and for ending the other pulse of said pair thereof in coincidence with the trailing edge of the concurrent wave-signal pulse; means for combining the two pulses of each said pair of pulses in the same sense to obtain a composite pulse; means for integrating each said composite pulse to obtain a resultant pulse; and means responsive to said resultant pulses for developing a resultant modulation signal which is dependent on said time modulation of said wave-signal pulses, whereby said arrangement is made substantially less responsive to noise modulation which tends to displace said leading and said trailing edges of said wave-signal pulses in opposite directions.

3. A wave-signal translating arrangement for wave-signal pulses having leading and trailing edges, at least one type of said edges being time-modulated in accordance with an instantaneous value of a modulation signal, comprising: pulse-shaping means for deriving from said pulses substantially rectangular pulses having substantially constant amplitudes; means for deriving from said rectangular pulses substantially symmetrical peaked pulses having the peaks thereof delayed with respect to the centers of the corresponding rectangular pulses by a substantially constant time interval; differentiating means for deriving a pair of pulses of opposite polarity from the leading and trailing edges of said peaked pulses; means for deriving a single shorter duration pulse in coincidence with the intercept between each said pair of pulses; and a pulse-time detector responsive to said shorter duration pulses for deriving a resultant modulation signal which is dependent on said time modulation of said wave-signal pulses, whereby said arrangement is made substantially less responsive to noise modulation which tends to displace said leading and said trailing edges of said wave-signal pulses in opposite directions.

4. A wave-signal translating arrangement for wave-signal pulses having leading and trailing edges, at least one type of said edges being time-modulated in accordance with an instantaneous value of a modulation signal, comprisng: pulse-shaping means for deriving from said pulses substantially rectangular pulses having substantially constant amplitudes; low-pass filter means having uniform phase slope for deriving from said rectangular pulses substantially symmetrical peaked pulses having the peaks thereof delayed with respect to the centers of the corresponding rectangular pulses by a substantially constant time interval; differentiating means for deriving a pair of pulses of opposite polarity from the leading and trailing edges of said peaked pulses; means for deriving a single shorter duration pulse in coincidence with the intercept between each said pair of pulses; and a pulse-time detector responsive to said shorter duration pulses for deriving a resultant modulation signal which is dependent of said time modulation of said wave-signal pulses, whereby said arrangement is made substantially less responsive to noise modulation which tends to displace said leading and said trailing edges of said wave-signal pulses in opposite directions.

5. A signal-translating arrangement for applied signal pulses having leading and trailing edges, at least one type of said edges being time-modulated in accordance with a modulation signal, comprising: means effectively responsive to said pulses for deriving from each thereof a pair of pulses, each pulse of said pair having a pulse characteristic which varies with the time of occurence of an indivdual type of said edges of said each applied pulse; means responsive to each of said pairs of derived pulses for developing therefrom at least one pulse having a characteristic which varies with the average time of occurrence of said edges of said each applied pulse; and means responsive to said characteristic of said developed pulses for deriving a resultant modulation signal which is dependent on the time modulation of said applied pulses, whereby said arrangement is substantially less responsive to noise modulation which tends to displace said one type and said other type of edges of said pulses in opposite directions.

HAROLD A. WHEELER.

REFERENCES CITED

The following references are of record in the file of this patent:

UNITED STATES PATENTS

| Number | Name | Date |
|---|---|---|
| 2,113,214 | Luck | Apr. 5, 1938 |
| 2,406,790 | Beatty | Sept. 3, 1946 |
| 2,410,000 | Anderson | Oct. 29, 1946 |
| 2,430,154 | Woodward | Nov. 4, 1947 |
| 2,448,718 | Koulicovitch | Sept. 7, 1948 |

FOREIGN PATENTS

| Number | Country | Date |
|---|---|---|
| 540,233 | Great Britain | Oct. 9, 1941 |